(12) United States Patent
Flaherty (10) Patent No.: US 7,540,501 B2
(45) Date of Patent: Jun. 2, 2009

(54) SEGMENTED SHAFT SEAL (75) Inventor: Andrew L. Flaherty, Murrieta, CA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 10/981,857

(22) Filed: Nov. 5, 2004

(65) Prior Publication Data
US 2006/0097457 A1   May 11, 2006

(51) Int. Cl.
*F16J 15/34* (2006.01)
*F16J 15/00* (2006.01)
*F16J 15/32* (2006.01)

(52) U.S. Cl. .................. 277/399; 277/416; 277/543; 277/559

(58) Field of Classification Search ........... 277/399–40, 277/416, 543, 544, 559
See application file for complete search history.

(56) References Cited

U.S. PATENT DOCUMENTS

| | | | |
|---|---|---|---|
| 1,822,722 A | 9/1931 | Bell | |
| 3,333,855 A | 8/1967 | Andresen | |
| 3,430,967 A | 3/1969 | Junker | |
| 3,575,424 A | 4/1971 | Taschenberg | |
| 3,874,677 A | 4/1975 | Ludwig et al. | |
| 4,082,296 A * | 4/1978 | Stein | 277/400 |
| 4,384,727 A | 5/1983 | Junker | |
| 4,635,946 A * | 1/1987 | Stanley | 277/559 |
| 4,898,394 A | 2/1990 | Voitik | |
| 5,039,115 A | 8/1991 | Hebert et al. | |
| 5,145,189 A | 9/1992 | Pope | |
| 5,169,159 A * | 12/1992 | Pope et al. | 277/422 |
| 5,558,341 A | 9/1996 | McNickle et al. | |
| 6,338,490 B1 | 1/2002 | Bainachi | |
| 6,371,488 B1 * | 4/2002 | Szymborski et al. | 277/365 |
| 6,439,578 B1 | 8/2002 | Radcliffe | |
| 6,692,006 B2 * | 2/2004 | Holder | 277/346 |

* cited by examiner

*Primary Examiner*—Vishal Patel
(74) *Attorney, Agent, or Firm*—Flynn, Thiel, Boutell & Tanis, P.C.

(57) ABSTRACT

A segmented shaft seal is provided for circumferentially sealing an outer surface of a rotating shaft unit. The shaft seal includes a plurality of seal ring segments disposed within a housing having a circumferential spring holding the ring segments together. The ring segments further have lift grooves defined on the circumferential inner surfaces thereof to generate a radially outwardly directed lift force acting against the inwardly directed spring force. The lift grooves have a tapered profile radially and/or circumferentially to facilitate formation of the outwardly directed lift force as well as molding of the ring segments.

15 Claims, 12 Drawing Sheets

FIG. 16 ent of FIG. 1 with a segmented shaft seal assembly of the
SEGMENTED SHAFT SEAL

FIELD OF THE INVENTION

The invention relates to a segmented shaft seal adapted for sealing the outer circumferential surface of a rotating shaft.

BACKGROUND OF THE INVENTION

Various mechanical seals have been provided for sealing radial spaces between a rotating shaft unit and an equipment body. Of these seals, segmented shaft seals have been provided which comprise a seal ring defined by arcuate ring segments that are retained within a holder in circumferentially adjacent relation to define an annular seal ring. The ring segments are biased radially inwardly by a spring into circumferential contact with the rotating shaft to define a circumferential seal about the outer surface of the shaft unit.

Some of such seals include cavities on the inner surfaces of the rings which receive fluid being sealed therein to generate an outward radial lifting force. An example of such a seal is disclosed in U.S. Pat. No. 3,874,677 (Ludwig, et al).

In known conventional seals, such seals often require machining on the inside diameter to form annular grooves or on the outside diameter to form an additional annular groove in which a garter spring is seated, which machining has proven to be undesirable. Further, such annular grooves such as these tend to collect contaminants and debris carried in the sealed fluid.

It is an object of the invention to overcome these and other disadvantages associated with such known segmented shaft seals.

The invention relates to an improved segmented shaft seal, which is particularly designed to facilitate molding of the shaft segments and eliminate machining thereof. In this regard, the ring segments of the invention are formed with tapered lift grooves on the inside diameter thereof which taper radially and/or circumferentially to permit axial removal of a mold die during molding of the ring segments. The tapered shape of the lift grooves further facilitates the formation of radial hydrostatic lift during operation of the seal so as to counteract radially inwardly directed spring forces generated by a garter spring extending about the ring segments and thereby reduce the contact pressure between the inner diameter of the seal ring and the opposing outer shaft surface.

Additionally, the ring segments are formed with a spring channel on the outside thereof which is open axially on one side so as to permit axial sliding of the garter spring onto the ring segments. The spring channel is configured so as to readily permit axial removal of a mold die such that molding forms the spring channel which eliminates the need for machining thereof.

Still further, the seal ring of the invention includes an improved assembly wherein the ring segments are seated within an annular cup-shaped housing and held in place along with a garter spring by a backing ring, which is frictionally fitted within an open side of the housing.

The segmented shaft seal of the invention provides advantages over prior art segmented seals in the formation of the ring segments, the assembly of the seal components and the operation of the seal.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
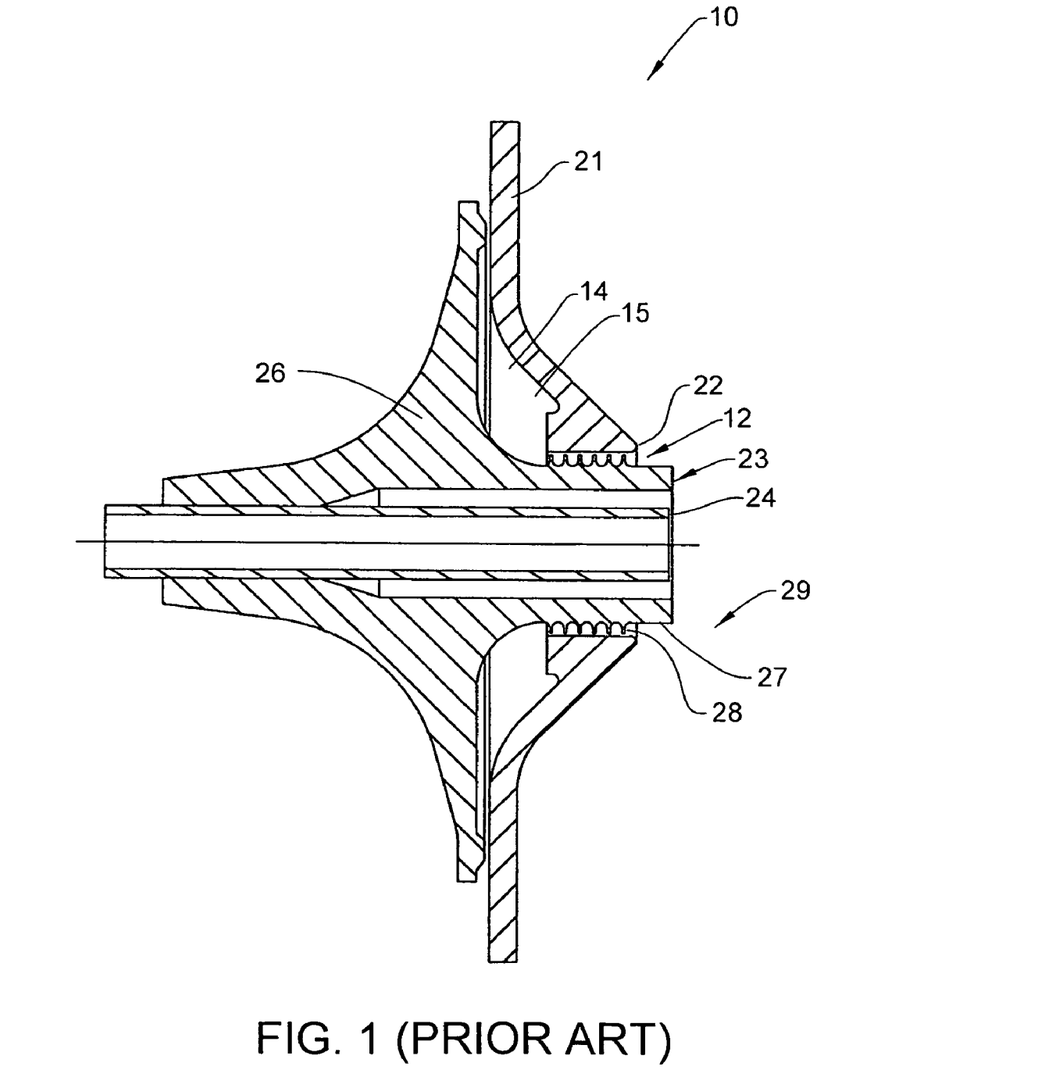
FIG. 1 is a side cross-sectional view of an illustrative rotating shaft unit and equipment body with a labyrinth seal disposed between the equipment body and the rotational shaft unit.

A general example of rotating equipment 10 is illustrated in FIG. 1 with a conventional labyrinth seal 12 being provided which prevents or limits the leakage of a sealed fluid 14 from a fluid chamber 15.

Figure 2:
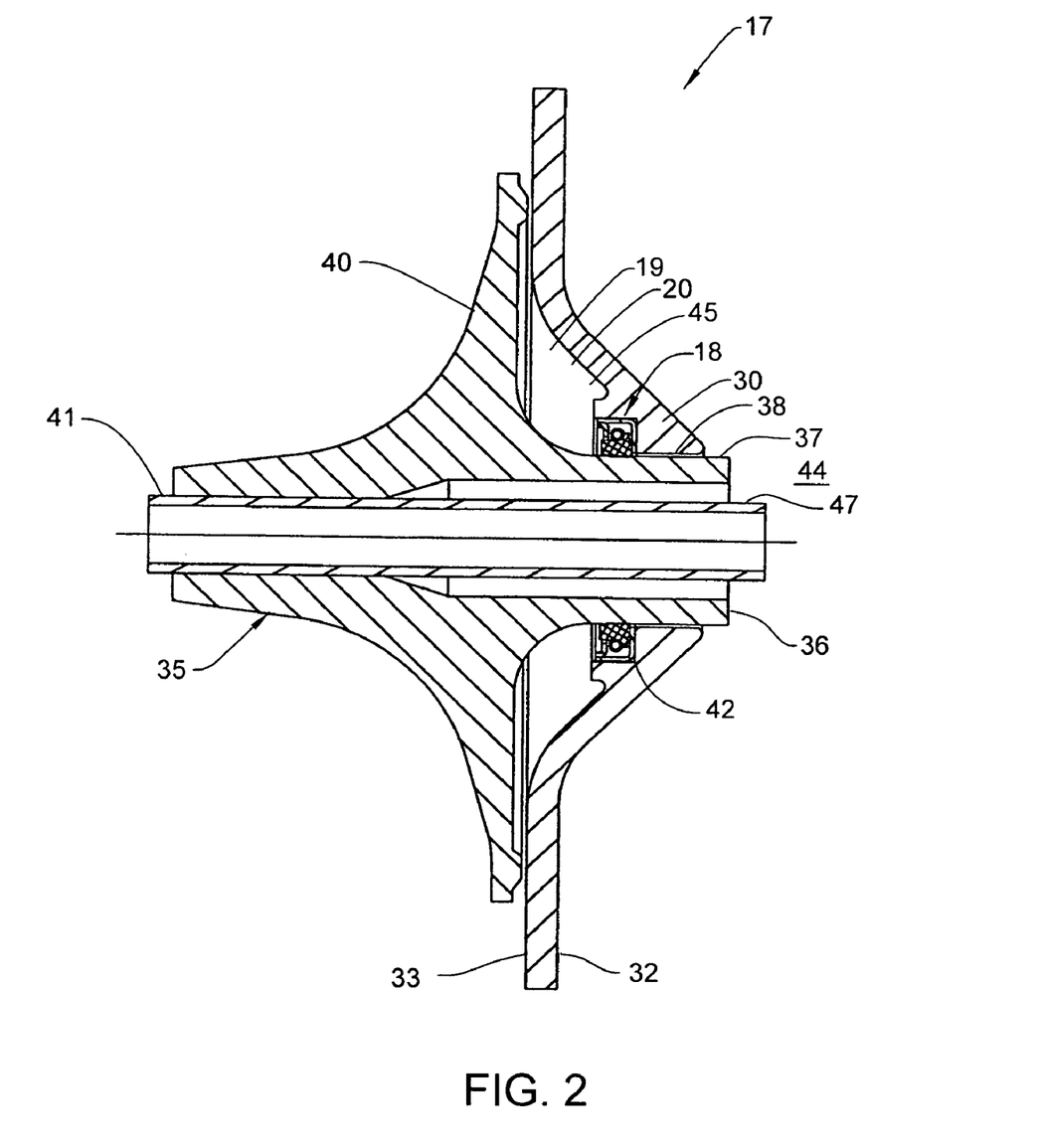
FIG. 2 is a side cross-sectional view of the rotating equipment of FIG. 1 with a segmented shaft seal assembly of the invention disposed therein.

FIG. 2 illustrates an improvement to such rotating equipment which equipment is designated by reference numeral 17 and includes a segmented shaft seal 18 positioned therein for preventing the leakage of a sealed fluid 19 from a fluid chamber 20. The segmented shaft seal 18 provides an improved circumferential seal arrangement as discussed in further detail herein.

More particularly as to the rotating equipment 10 illustrated in FIG. 1, this equipment generally includes a stationary equipment body 21 having a shaft bore 22 opening centrally therethrough. A shaft unit 23 extends through said bore 22 and generally includes a central drive shaft 24 on which is mounted a rotating body 26, such as an impeller or the like.

The rotating body 26 in the illustrated embodiment defines an outer shaft surface 27 on which is formed the radial projections 28 which define the labyrinth seal 12. With this arrangement the labyrinth seal 12 sealingly separates the sealed fluid 14 in the fluid chamber 20 from an exterior fluid 29, which for the illustrated rotating equipment 10 likely would be ambient air. This rotating equipment 10 as illustrated in FIG. 1 is shown for environmental purposes to illustrate an example of a known seal arrangement.

FIG. 2 illustrates a similar arrangement of rotating equipment 17 in which is provided the improved segmented shaft seal 18.

More particularly as to FIG. 2, the rotating equipment 17 is illustrated for diagrammatic purposes to illustrate the environment in which the segmented shaft seal 18 is provided. As discussed in further detail herein, this rotating equipment 17 can be any conventional type of rotating equipment in which a segmented shaft seal 18 might be provided, and hence, the following description does not limit the construction of the rotating equipment 17.

As to the equipment 17, this equipment 17 includes an equipment body 30 which typically would be a housing of the equipment 17. This equipment body 30 remains stationary during use and defines a central shaft bore 31, which opens axially through the thickness thereof. The equipment body 30 further includes an exterior surface 32 and an interior surface 33, wherein the interior surface 33 encloses the fluid chamber 20 adjacent thereto in which is confined the sealed fluid 19.

Figure 3:
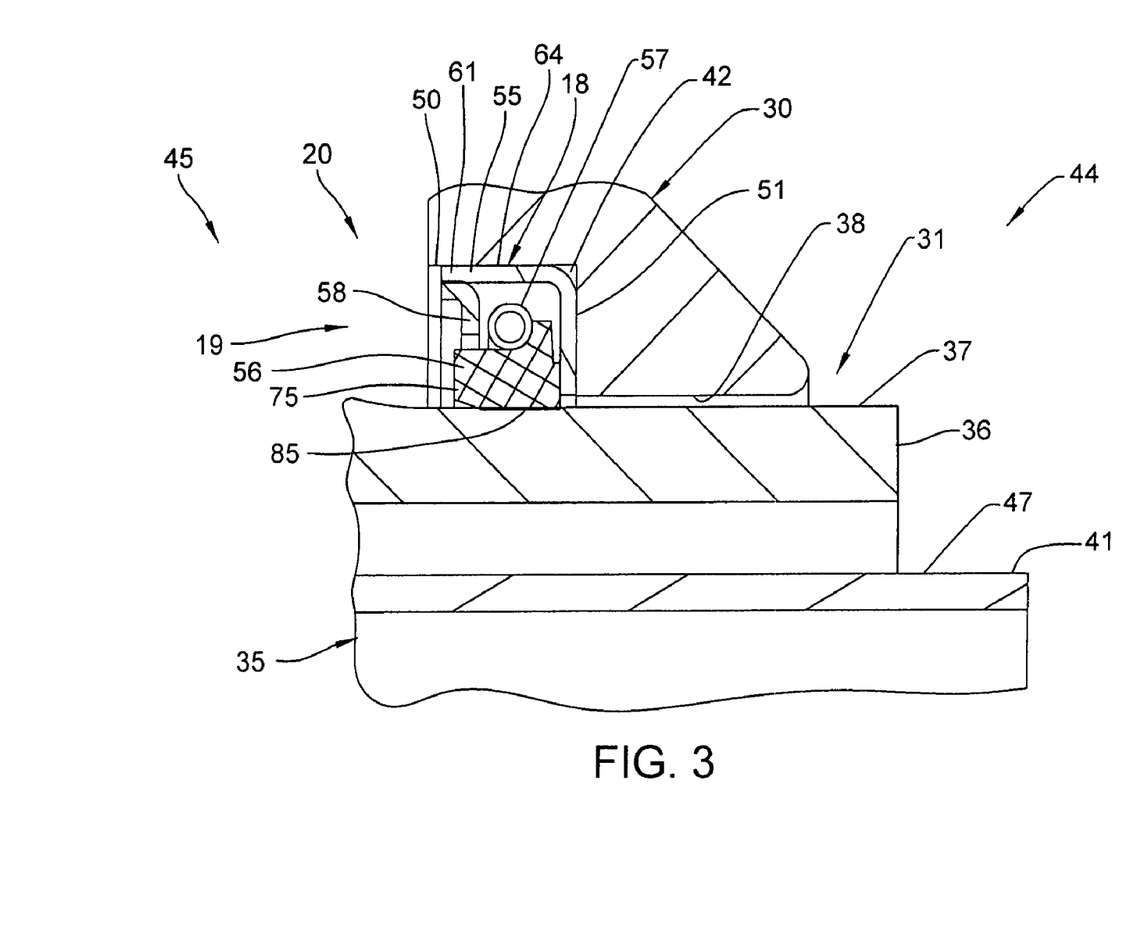
FIG. 3 is an enlarged cross-sectional view of the segmented shaft seal cooperating between the equipment body and the shaft assembly of FIG. 2.

The rotating equipment 17 further includes a shaft unit 35 having a rotatable shaft section 36 which projects through said shaft bore 31 and defines an outer shaft surface 37 that faces radially outward in opposing relation with an interior surface 38 of the shaft bore 31. The opposing shaft surface 37 and the interior bore surface 38 are radially spaced to a small extent as best seen in FIG. 3 to permit free rotation of the shaft unit 35 within the bore 22 during operation of the rotating equipment 17.

The shaft unit 35 further comprises a rotary section 40 (FIG. 2), which in the illustrated embodiment is provided in the form of an impeller for pumping of the sealed fluid 19. The rotary section 40 is formed integrally with the shaft section 36 and is fixedly mounted on a drive shaft 41, which extends centrally therethrough such that upon rotation of the drive shaft 41 by a motor or engine, the rotary section 40 rotates therewith in unison.

To prevent leakage of the sealed fluid 19 from the fluid chamber 20, the shaft seal 18 is provided so as to cooperate with the outer shaft surface 37 and prevent or minimize leakage of fluid along this shaft surface 37. Referring more particularly to FIGS. 2 and 3, the equipment body 21 is formed with an annular pocket or seat 42, which pocket 42 opens axially towards the fluid chamber 20 and is adapted to receive the segmented shaft seal 18 axially therein. As such, the segmented shaft seal 18 seals the fluid chamber 20 from an adjacent fluid region 44 such that the sealed fluid 19 is impeded from leaking along the outer shaft surface 37 in the space formed radially between this shaft surface 37 and the opposing bore surface 38.

Typically, the fluid pressure of the sealed fluid 19 in the fluid chamber 20 is at a higher pressure than the pressure of the fluid disposed in the fluid region 44 such that the fluid region 44 essentially defines a low pressure fluid region while the fluid chamber 20 defines a high pressure fluid region 45. The reference to high and low pressures indicates that the fluid in the fluid chamber 20 is higher than the pressure of the low pressure region 44 and is not intended to indicate a magnitude of the pressures within these two fluid regions 44 and 45.

More particularly as to the rotating equipment 17, this equipment 17 is illustrated in a representative configuration in FIG. 2 but is intended to represent any rotating equipment in which the segmented shaft seal 18 may be fitted. Therefore, while the rotating equipment 17 might be a pump, this equipment also could take the form of a compressor, turbocharger, bearing sump, fan, blower or the like. Therefore, the disclosure herein is not limited to a specific type of rotating equipment 17.

Further, the fluid referenced herein may be either a liquid or gas. For example, the fluid in the high-pressure region 45 may be a gas such as air, turbine exhaust gas, diesel exhaust gas, vapor such as a refrigerant gas, nitrogen or other gases compatible with the fluid in the low-pressure fluid region 44, and the fluid also may be a liquid such as oil or water. Similarly, the fluid in the low-pressure fluid region 44 may also be any of the above-identified gases or liquids or a mix of a liquid in one region and a gas in the other region. As can be seen, the segmented shaft seal 18 of the invention has numerous applications for sealing the rotating outer shaft surface 37.

Still further, the high pressure fluid region 45 (FIG. 2) typically is confined within the interior of the rotating equipment 17, while the low pressure region 44 may be on the outside of the equipment body such as in a compressor, or may be another interior chamber within the rotating equipment 17. As such, the fluids within the high and low pressure fluid regions 44 and 45 may either be the same type of fluid or be different fluids not only as to different types of gases but also the combination of a sealed fluid in one fluid region and ambient air or another internal fluid in the other fluid region.

Still further, the references to the pressures in the fluid regions 44 and 45 as being respectively low and high references a typical arrangement in rotating equipment 17. However, the pressures may also be reversed such as during upset conditions within the equipment or because of the design of the equipment with the fluid chamber 20 being designed to contain a lower pressure fluid. Preferably, however, for best operation of the segmented shaft seal 18 as illustrated, the sealed fluid 19 in region 45 preferably is at a higher pressure than the fluid in region 44.

As to the shaft unit 35 (FIG. 2), this shaft unit 35 is illustrated as an assembly of a drive shaft 41 and the rotary section 40 mounted thereto wherein the rotary section 40 defines the outer shaft surface 37.

It will be understood that the shaft unit 35 alternatively may be a single integral piece such as an enlarged version of the drive shaft 41 wherein the outer surface 47 thereof would essentially define the outer shaft surface 37 and be disposed closely adjacent to the opposing interior surface 38.

Further, the shaft unit 35 may still be an assembly of components with the rotary section 40 merely being provided at the end of the drive shaft 41 while the shaft section 36 is omitted from the rotary section 40 so that the rotary section 40 terminates axially away from the segmented shaft seal 18. In such an instance, the diameter of the drive shaft 41 may either be enlarged so as to have the same diameter as the outer shaft surface 37 or the illustrated diameter of the shaft 41 may be maintained with the shaft bore 31 then being reduced so as to only be slightly larger than the outer surface 47. Hence, the identified outer shaft surface 37 references an outer shaft surface that is either defined by an assembly of components or by a single unitary drive shaft.

Turning to the shaft seal 18, FIG. 3 is an enlarged illustration of the segmented shaft seal 18 supported within the annular seal seat 42 of the equipment body 30.

More particularly, the seal seat 42 is defined by an annular side face 50, which faces radially inwardly, and an end face 51, which faces axially outwardly, preferably towards the fluid chamber 20. The seal seat 42 is open on the side thereof adjacent to the fluid chamber 20 so as to permit the shaft seal 18 to be slid axially into tight fitting engagement with the seal seat 42.

The shaft bore 31 has the interior surface 38 thereof spaced a slight radial distance from the outer shaft surface 37 to permit assembly of the shaft unit 35 and the equipment body 21 together. Generally during rotation of the shaft unit 35, the outer shaft surface 37 rotates relative to the stationary interior surface 38 wherein the shaft seal 18 maintains a fluid seal with the outer shaft surface 37 during shaft rotation to sealingly separate the fluid regions 44 and 45.

The shaft seal 18 generally includes a housing 55 and an annular seal ring 56 received within the housing which seal ring continuously contacts the outer shaft surface 37 to maintain sealing cooperation therewith. The shaft seal 18 further comprises an annular garter spring 57 extending about the periphery of the seal ring 56, and a backing ring 58 which fits axially into the housing 55 through an open side thereof to axially confine and hold the seal ring 56 and garter spring 57 in place within the housing 55.

Figure 5:
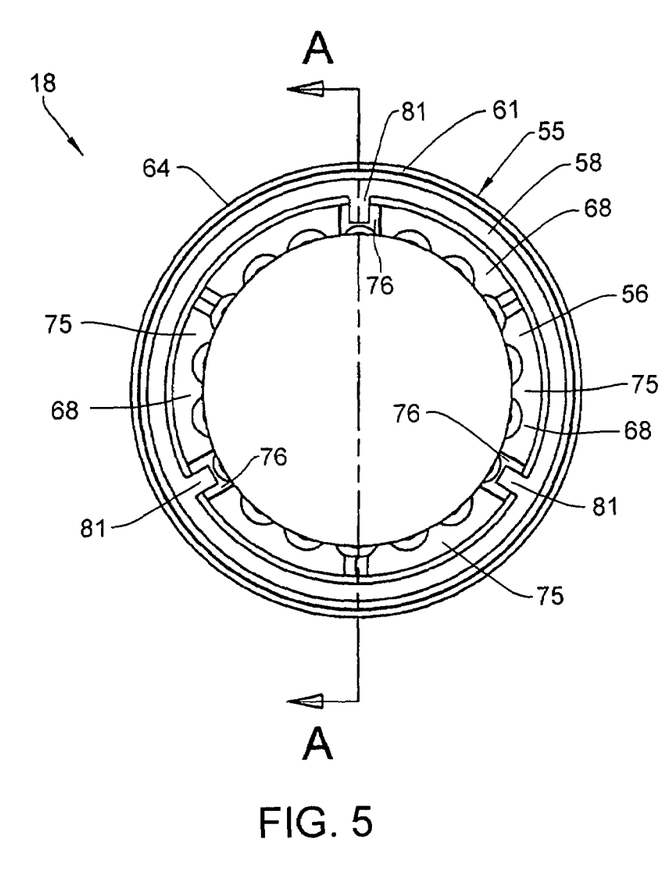
FIG. 5 is an end view of the seal assembly.
Figure 6:
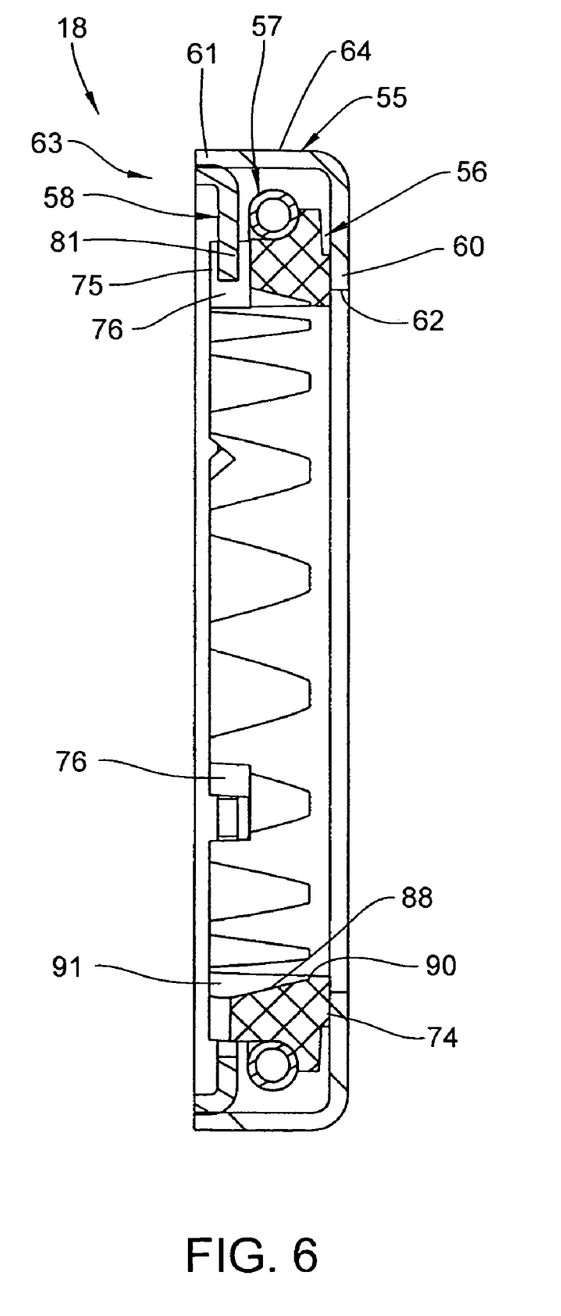
FIG. 6 is a side cross-sectional view of the seal assembly as taken along line A-A of FIG. 5.
Figure 7:
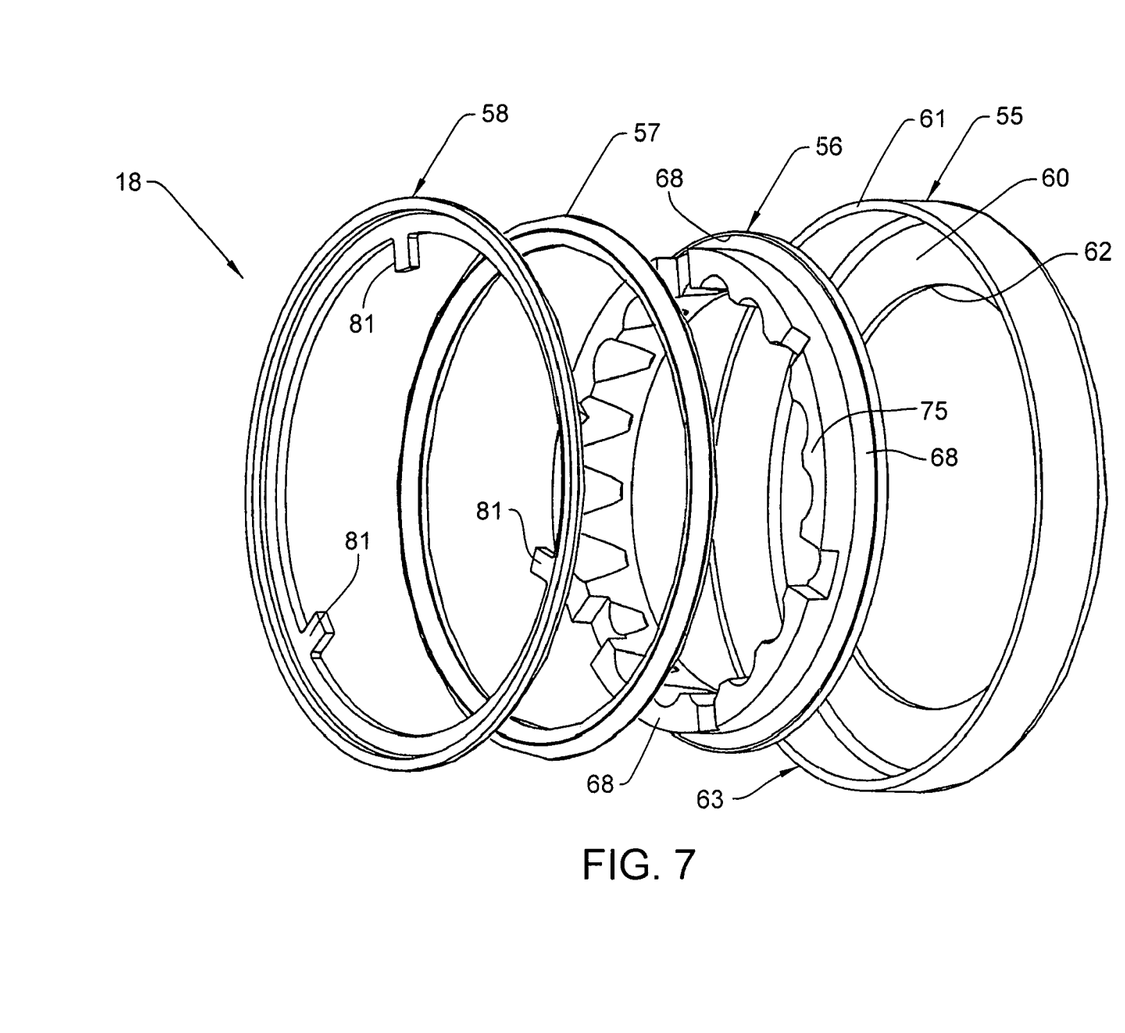
FIG. 7 is an exploded pictorial view of the seal assembly components.
Figure 8:
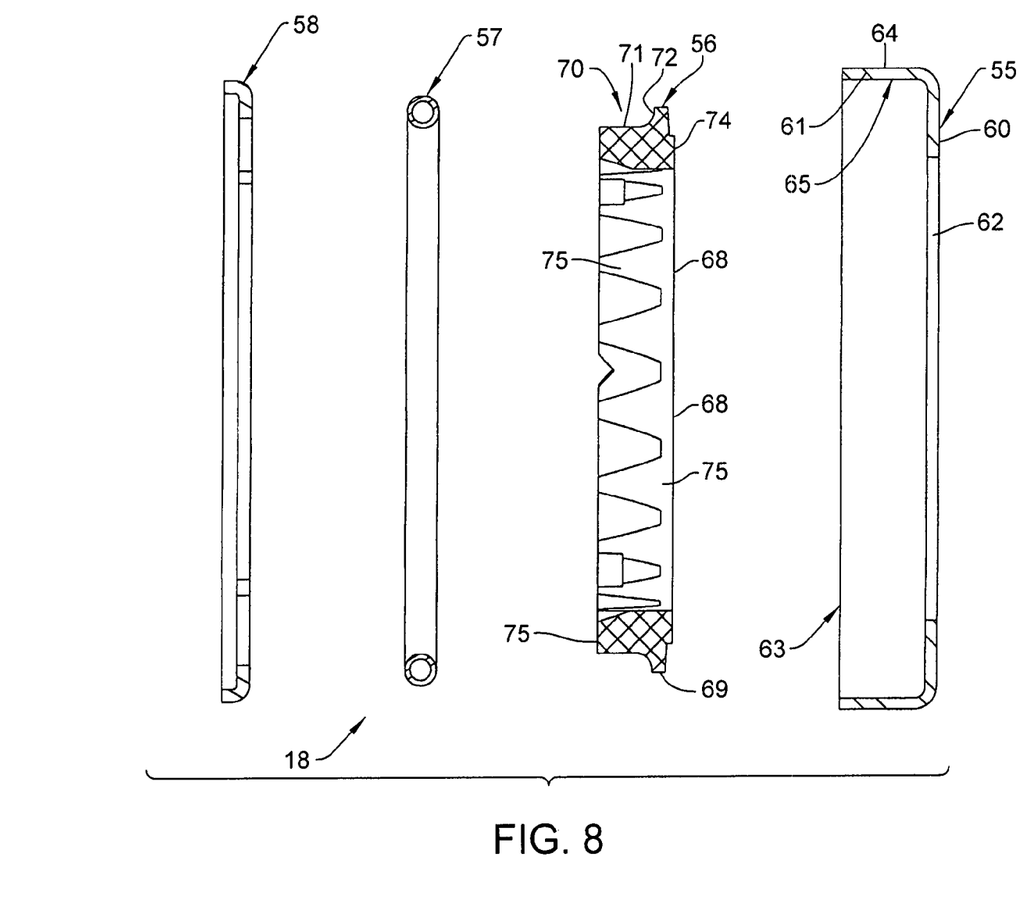
FIG. 8 is a side cross-sectional view of the seal components.

More particularly as to FIGS. 4-8, these figures illustrate the afore-mentioned seal components 55-58 in assembled form (FIGS. 4-6) and in exploded form (FIGS. 7-8).

As to the housing 55, this housing 55 is an annular hoop formed of a suitable metal or other rigid material which comprises an end wall 60 that extends radially outwardly. The housing 55 could be incorporated into the equipment body 30 wherein the seal components would be assembled into the body 30.

The housing end wall 60 integrally joins to an outer wall 61 so as to have an L-shaped cross-section as illustrated in FIGS. 6 and 8, and includes a central opening 62 which is sufficiently large as to loosely receive the shaft section 36 axially therethrough. Opposite to the end wall 60, the housing 55 has an open side 63 through which the remaining seal components 56-58 are adapted to be inserted.

Figure 4:
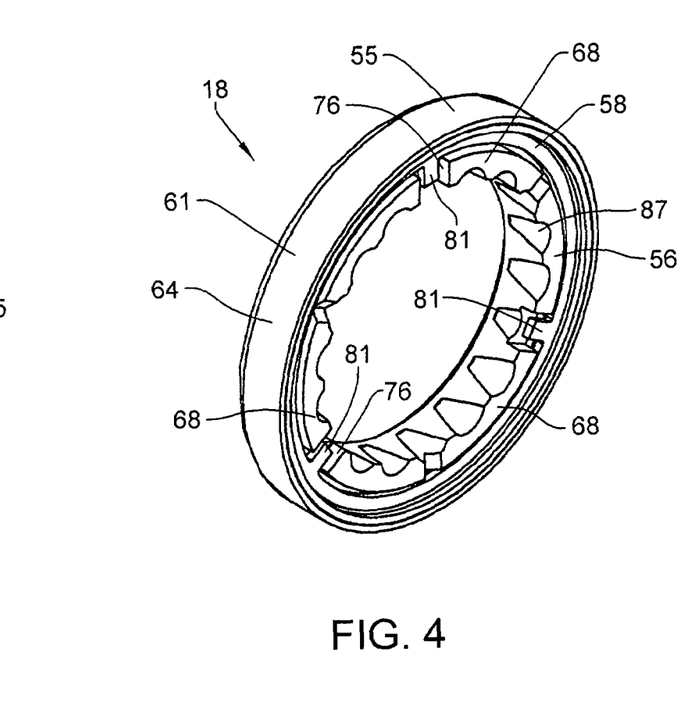
FIG. 4 is a pictorial view of the seal assembly of the invention.

Referring to FIGS. 3-5, the outer housing wall 61 includes an outer circumferential surface 64 which is adapted to snugly fit radially within and against the axial seat face 50 such that the shaft seal 18 is stationarily held within the seal seat 42 and does not rotate within the seat 42 during shaft rotation. The sealed fluid 19 is prevented from leaking between the outer housing wall 61 and the opposing axial seat face 50 due to the close fit therebetween. The outer wall 61 further includes an interior circumferential surface 65 which faces radially inwardly.

Figure 9:
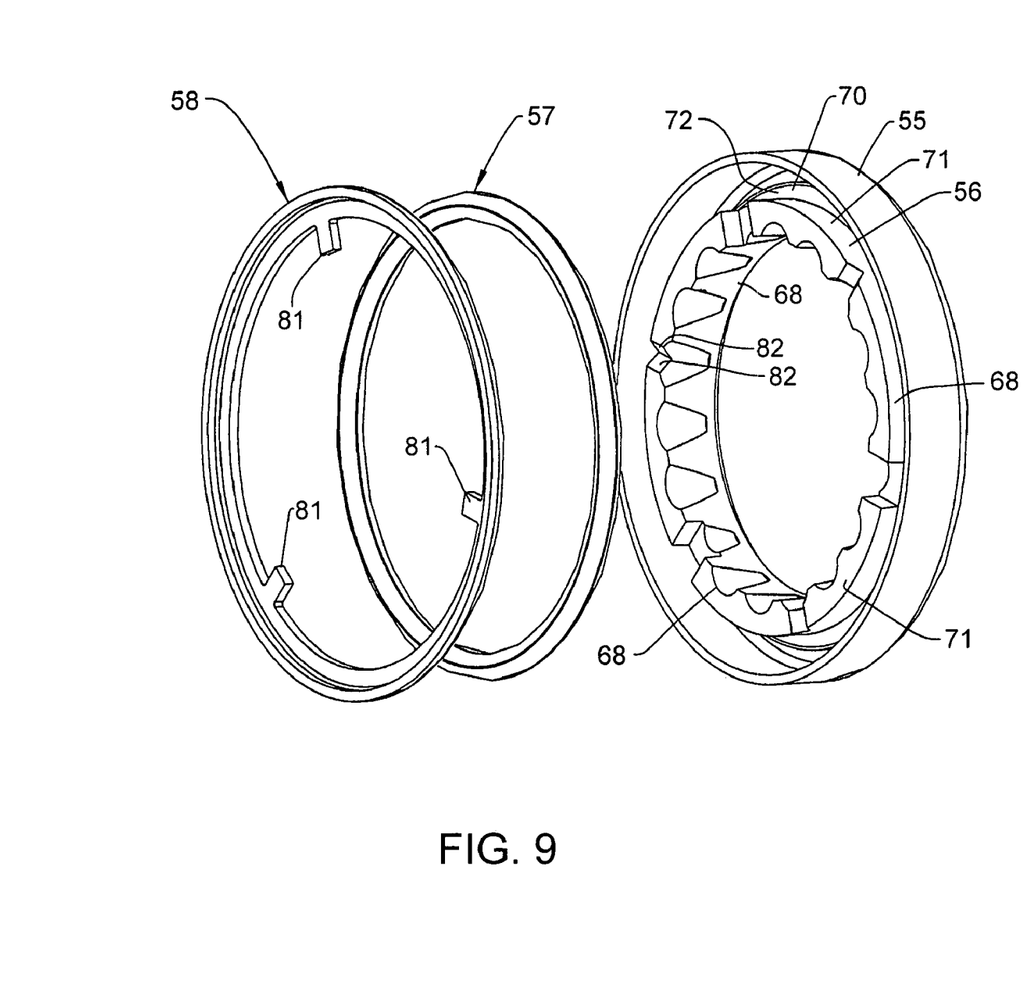
FIG. 9 is a pictorial view of the shaft components with a plurality of seal ring segments disposed within a housing.
Figure 10:
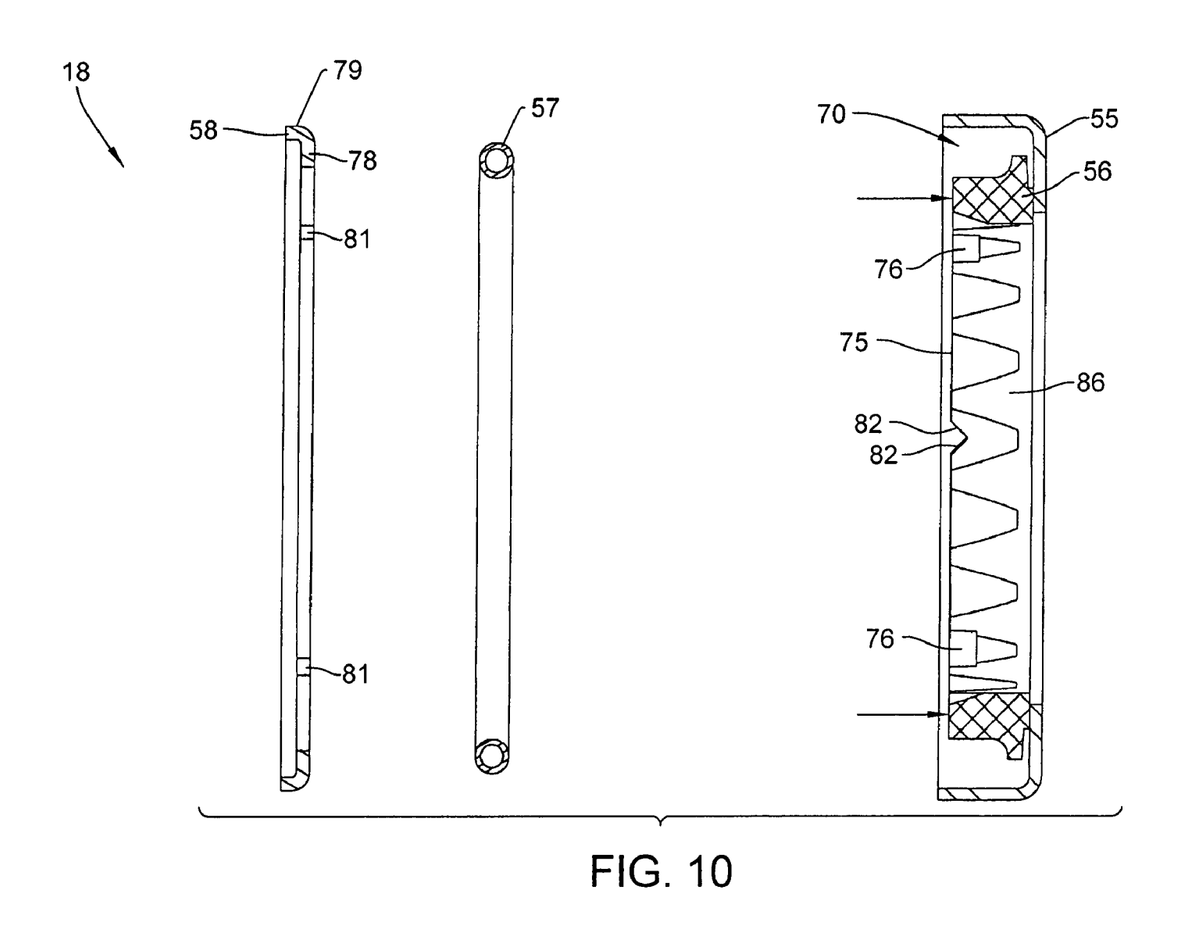
FIG. 10 is a side cross-sectional view of the components of FIG. 9.

As to the seal ring 56, this seal ring 56 is adapted to be slid axially into the housing 55 through the open side 63 as generally illustrated in FIGS. 9 and 10.

Referring to FIGS. 8-10 and 13-14, the seal ring 56 is formed as a segmented carbon seal ring comprising a plurality of arcuate ring segments 68 which are all formed identical to each other, and define the annular seal ring 56 when positioned circumferentially adjacent to each other in end-to-end relation. Each ring segment 68 preferably is formed through a molding process as discussed in further detail herein.

Figure 11:
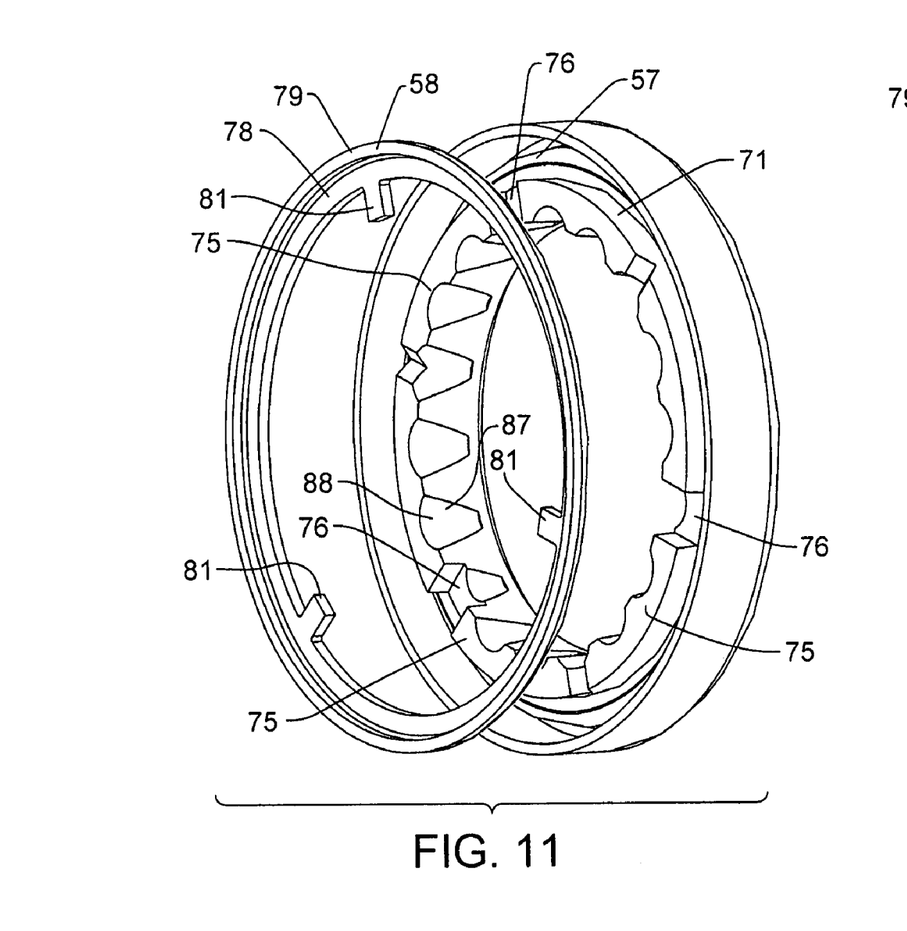
FIG. 11 is a pictorial view of the seal components with a garter spring positioned within the housing.
Figure 12:
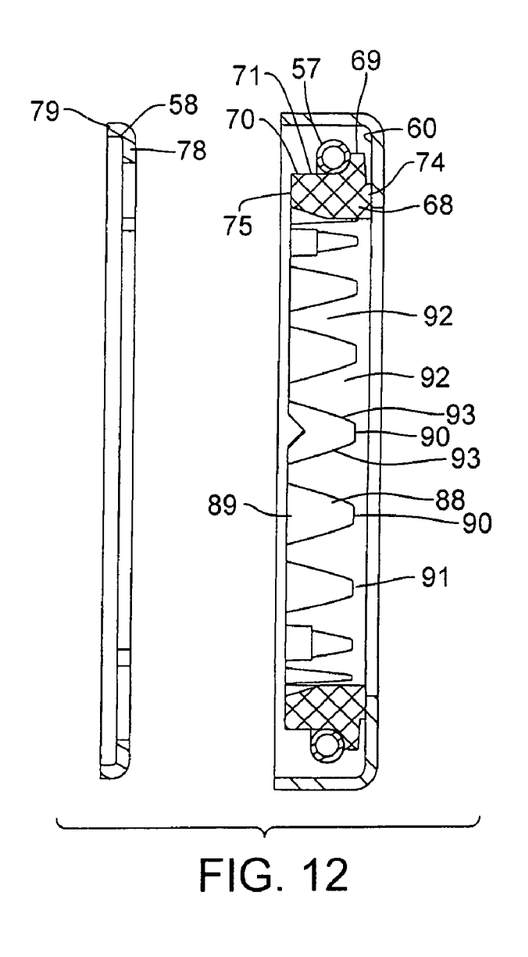
FIG. 12 is a side cross-sectional view of the components of FIG. 11.
Figure 13:
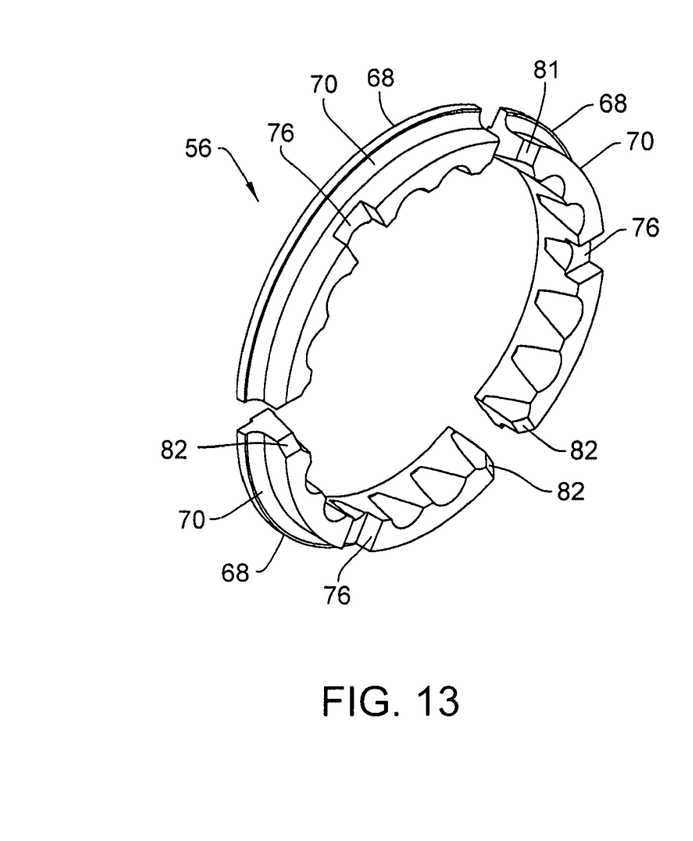
FIG. 13 is an exploded pictorial view of the ring segments.
Figure 14:
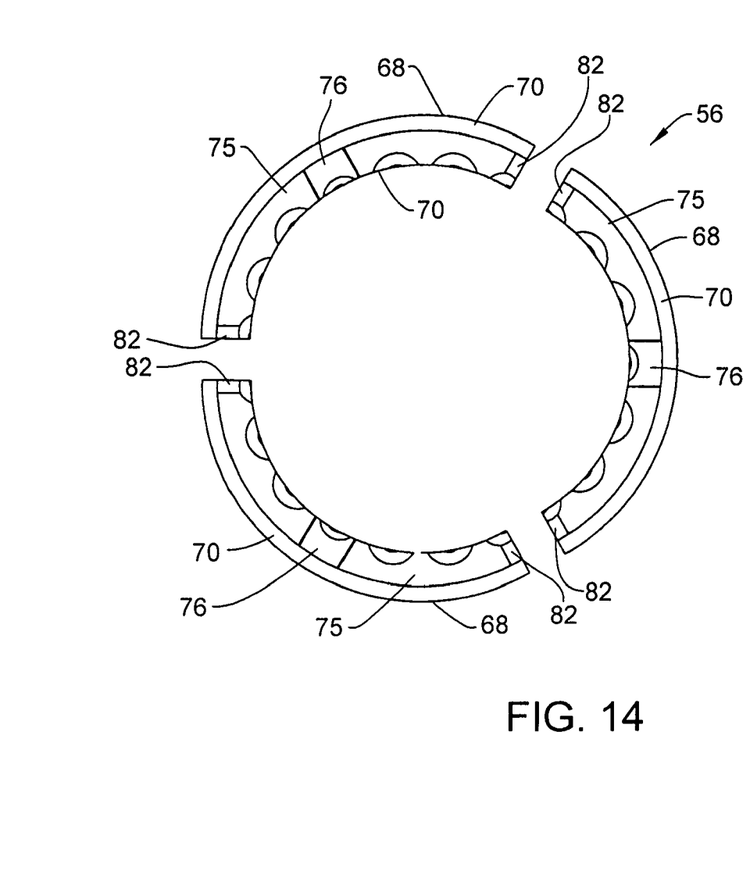
FIG. 14 is an exploded end view of the ring segments.

Each ring segment 68 (FIGS. 8 and 9) is defined by an outer ring surface 69, wherein the outer circumferential portion of the ring segment 68 is formed with a spring channel 70 defined by an outward facing side surface 71 and an axial facing end surface 72. The spring channels 70 align in registry with each other when ring segments 68 are joined together so as to define a circumferentially-continuous channel in which the spring 57 is received as seen in FIGS. 11 and 12. It is noted that the spring channel 70 opens axially sidewardly so as to permit the garter spring 57 to be slid axially onto the ring segments 68 and maintain the ring segments 68 together in circumferentially adjacent relation. Preferably, the juncture between the side surface 71 and end surface 72 is arcuate as seen in cross-section in FIG. 8 so as to generally conform to the arcuate surface of the garter spring 57 as seen in FIG. 12.

Preferably the spring channel 70 either has a constant radial depth or a progressively decreasing radial depth as seen in FIG. 8 so that during molding of the ring segments 68, a mold die, as discussed in further detail herein, may be readily removed axially from the ring segments 68.

Referring to FIG. 12, the ring segments 68 further are defined by an inner end face 74 which is adapted to abut against the opposing interior face of the end housing wall 60. Opposite to the inner end face 74, the ring segments 68 further include an outer end face 75 which faces outwardly of the housing 55 preferably towards the fluid chamber 20 (FIG. 3).

To prevent relative rotation of the seal ring 56 relative to the housing 55, each outer end face 75 of each ring segment 68 includes a rectangular notch 76 (FIGS. 13 and 14) which is disposed at about the mid point of each ring segment 68. Each notch 76 at least opens radially inwardly and also axially outwardly for cooperation with the backing ring 58 (FIGS. 6, 11 and 12). In particular, once the seal ring 56 and garter spring 57 are positioned within the housing 55 as illustrated in FIGS. 11 and 12, the backing ring 58 is then inserted into the housing to the fully seated position illustrated in FIG. 6.

This backing ring 58 (FIGS. 11 and 12) is defined by an end wall 78 and an outer wall 79 which are joined together so as to have an L-shaped cross sectional configuration (FIG. 12). The end wall 78 includes three locking tabs 81 (FIG. 11) which project radially inwardly and are circumferentially spaced apart at equal distances so that the locking tabs 81 align with a respective one of the notches 76 as seen in FIGS. 4 and 5. When the backing ring 58 is fitted within the housing 55 (FIG. 6), the backing ring 58 is frictionally engaged therewith and remains stationary such that the tabs 81 engaged with the notches 76 to prevent relative rotation of the seal ring 56.

At the opposite ends of each ring segment 68, a bevel 82 (FIGS. 13 and 14) is provided, wherein, when assembled, each adjacent pair of bevels 82 defines a V-shaped notch (FIG. 9) in the outer end face 75 of the ring segments 68.

To thereby assemble the segmented shaft seal 18, the housing 55 is first positioned for receipt of the ring segments 68 as generally seen in FIG. 7, after which the ring segments 68 are positioned within the housing 55 (FIG. 9) in circumferentially adjacent relation. Thereafter, the garter spring 57 is fitted axially onto the ring segments 68 (FIG. 12) so as to circumferentially surround the ring segments 68 within the spring channel 70. The garter spring 57 thereby applies an inwardly directed spring force, preferably about the entire circumference of the seal ring 56. This maintains the ring segments 68 in an archbound condition.

Thereafter, the backing ring 58 is positioned with the tabs 81 aligned with the notches 76 on the ring segments, after which the backing ring 58 is then fitted within the housing 55 to the fully seated position (FIG. 6) so that all of the seal components 55-58 are assembled together with the seal ring 56 non-rotatably engaged with the housing 55.

Referring to FIG. 3, each ring segment 68 also includes an inner segment surface 85 which faces radially inwardly and is adapted to contact the outer shaft surface 37. These inner segment surfaces 85 align with each other when the shaft seal 18 is assembled together so as to define an inner circumferential surface or diameter 86 of the seal ring 56. This inner ring surface 86 circumferentially surrounds the outer shaft surface 37 and has continuous circumferential contact therewith so as to prevent leakage of the sealed fluid 19 along the outer shaft surface 37. When the shaft is not rotating, this inner ring surface 86, particularly when the shaft seal 18 is first installed, is in snug contact with the outer shaft surface 37. Upon shaft rotation, the inner spring surface 86 is worn in by the relative rotation of the outer shaft surface 37. Thus, there is a wearing process which occurs at the time of seal installation.

To provide improved seal operation, the inner ring surface 86 is provided with a plurality of circumferentially spaced apart lift or fluid feed grooves 87 (FIGS. 11 and 12) which preferably receive the sealed fluid 19 therein. The lift grooves 87 generate a hydrostatic lift force which acts radially outwardly in opposition to the inwardly directed spring force so as to reduce the contact pressures of the seal ring 56 on the outer shaft surface 37. This outwardly directed lift force thereby reduces the overall wear of the inner segment surfaces 85 and heat generation during the wear-in process while minimizing the small radial gap which typically forms between the inner ring surface 86 and the outer shaft surface 37 as a result of the wear-in process. These lift grooves 87 thereby reduce the overall inwardly directed radial forces and minimize the wear-induced radial dimension of the gap which results in reduced leakage along the outer shaft surface 37.

While the segmented shaft seal 18 attempts to prevent leakage of the sealed fluid 19, some minimal leakage typically does occur due to the nature of such seals. Since the radial gap is minimized, however, the lift grooves 87 of the invention are believed to provide improved seal operation.

More particularly, each lift groove 87 (FIGS. 11 and 12) has a tapered configuration so as to be tapered in the radial and/or circumferential directions. Preferably, the lift grooves 87 are tapered in both the radial and circumferential directions so as to provide the hydrostatic lift force due to the sealed fluid pressure, while the lift grooves 87 also facilitate molding of the ring segments 68.

Further, the lift grooves 87 permit elimination of machined features on the inner ring surface 86 which might collect debris and other contaminants within the sealed fluid which otherwise tend to collect in known surface formations.

Many known surface features are formed by machined recesses or pockets which typically are enclosed completely on one side by an annular sealing dam and almost completely on an opposite side with only circumferentially narrow, axial grooves being provided. The contaminants and debris are not free to exit from the pockets and thereby tend to collect in the pockets.

More particularly as to the tapered shape of the lift grooves 87, each lift groove 87 preferably is defined by an arcuate groove surface 88 (FIG. 11) which curves radially outwardly so as to be generally frusto-conical and define an open outer end 89 and a closed inner end 90 (FIG. 12). The grooves 87 extend partway across the axial width of the inner segment surface 85 such that the segment surface 85 includes a circumferentially continuous sealing dam 91 which is adapted to continuously contact the outer shaft surface 37. Further, the lift grooves 87 are circumferentially spaced apart so as to define a land 92 defined between circumferentially adjacent pairs of the grooves 87. The lands 92 and the sealing dam 91 effectively are circumferentially co-planar and are all adapted for contact with the shaft surface 37 to provide contact with the shaft surface 37 across the axial width of the inner ring surface 86 (as seen in FIG. 3).

Preferably the outer end 89 of each lift groove 87 opens axially towards the fluid chamber 20 so as to receive the sealed fluid 19 therein. The groove surface 88 is arcuate and is tapered so as to define a progressively decreasing radial depth of the lift groove as illustrated in FIG. 6. As such, each lift groove 87 is tapered in the radial direction (FIG. 9). Specifically, each groove 87 preferably has a radial depth which progressively decreases axially from the open end toward the closed inner end thereof.

Also, each lift groove 87 has opposite side edges 93 (FIG. 12) which converge circumferentially toward each other until terminating at the inner groove end 90. These convergent side edges 93 thereby define each lift groove 87 with a progressively decreasing circumferential width such that each groove 87 also is circumferentially tapered.

The arcuate groove surface 88 also forms a tapered radial depth which progressively decreases in the side-to-side direction (FIG. 5). The tapered radial depth in the axial and side-to-side directions and the tapered circumferential width all combine to define a hydrostatic lift feature which generates an outwardly directed hydrostatic force which counteracts at least partially the inwardly directed spring force 57.

Further, the multi-directional tapered shape of the grooves 87 also provides additional hydrodynamic lift forces during shaft rotation since the relative movement of the outer shaft surface 37 tends to hydrodynamically displace the sealed fluid 19 towards the circumferential side edges 93 and the tapered depth thereof to further increase the outwardly directed forces and reduce the contact pressures between the inner ring surface 86 and the outer shaft surface 37.

Additionally, it is believed that the tapered shape of the lift grooves 87 tends to facilitate the circulation of the sealed fluid 14 into and out of the lift grove 87 which provides advantages such as by tending to prevent the buildup of contaminants within the lift grooves 87.

Based upon the foregoing, the segmented shaft seal 18 of the invention is believed to provide improved performance over known segmented shaft seals. Additionally, the ring segments 68 are readily manufactured, preferably by molding thereof in a process which substantially avoids machining of the ring segments 68 to form the lift grooves 87.

Figure 15:
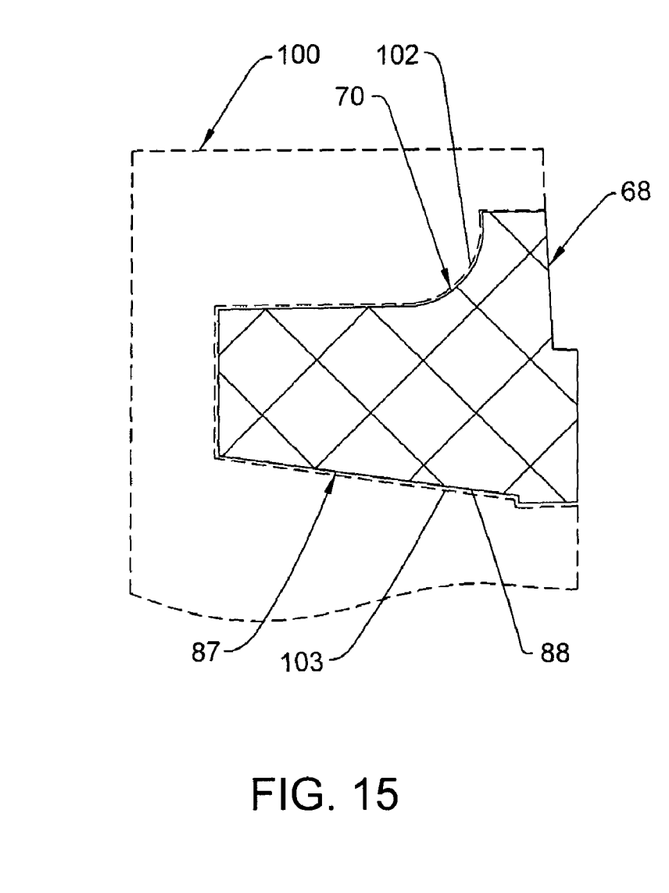
FIG. 15 illustrates a ring segment with a mold die in a molding position.
Figure 16:
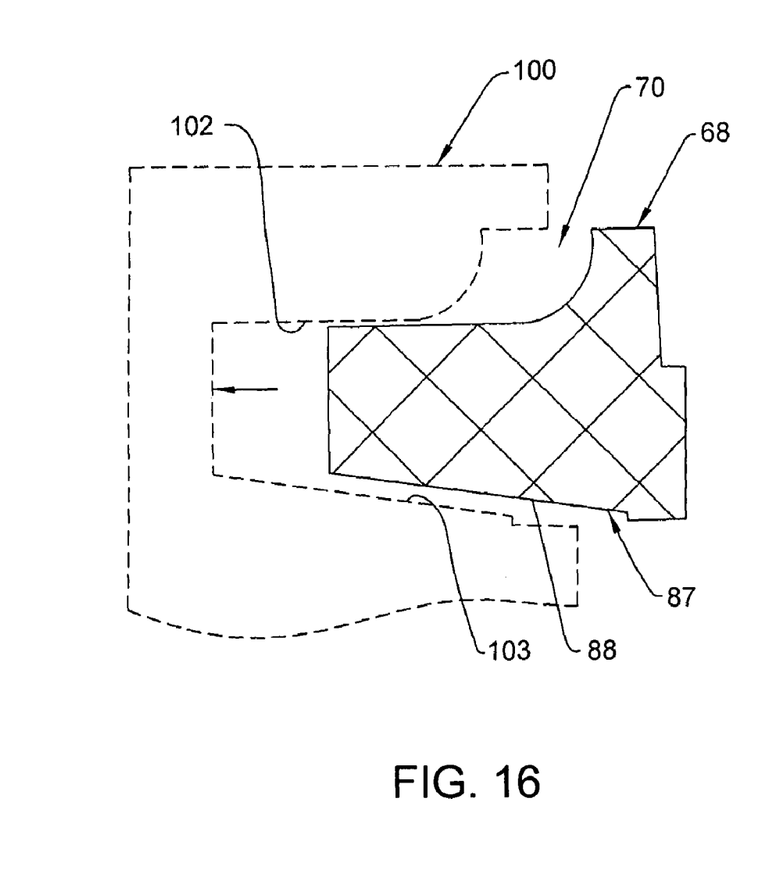
FIG. 16 illustrates the mold die in a removal position.

More particularly, it is noted that the spring channel 70 as well as the lift grooves 87 all open axially outwardly and do not have any radial obstructions which would prevent the axial removal of a mold die therefrom. Referring to FIGS. 15 and 16, a mold die 100 is illustrated in a molding position (FIG. 15) and a removal position (FIG. 16). It will be noted that the interior mold surfaces 102, 103 are unobstructed when being slid axially away from the respective surfaces of the ring segments 68 including the spring channel 70 and the arcuate groove surface 88 and the lift grooves 87. This further facilitates assembly in that the ring segments 68 may be readily positioned axially into the housing 55 (FIG. 10), with the garter spring 57 and backing ring 58 then being positioned sequentially into the housing 55 (FIGS. 12 and 6 respectively) in the axial direction through the open housing side 63.

Although a particular preferred embodiment of the invention has been disclosed in detail for illustrative purposes, it will be recognized that variations or modifications of the disclosed apparatus, including the rearrangement of parts, lie within the scope of the present invention.

The invention claimed is:

1. In a segmented seal assembly configured for mounting on an equipment body and a rotatable shaft for sealing an outer shaft surface of said rotatable shaft which is rotatable about a shaft axis extending in an axial direction, said seal assembly including an annular seal ring which extends circumferentially about a center ring axis extending in said axial direction so as to extend about said outer shaft surface to sealingly separate first and second fluid regions, said seal ring comprising a plurality of arcuate ring segments which are assembled within said seal assembly circumferentially adjacent to each other so as to define said seal ring, each said ring segment having opposite first and second end faces, which extend radially outwardly in a radial direction and respectively face axially toward said first and second fluid regions, and having inner and outer segment surfaces, which extend axially in said axial direction between said first and second end faces and respectively face radially inwardly and outwardly relative to said ring axis so as to be radially spaced apart, wherein said inner and outer segment surfaces of said circumferentially adjacent ring segments extend circumferentially and respectively define an inner diameter and an outer diameter of said seal ring, said seal assembly including a biasing arrangement acting on said outer ring diameter to generate a respective biasing force on said ring segments which acts radially inwardly such that said inner diameter is adapted to sealingly cooperate with said outer shaft surface, comprising the improvement wherein said inner segment surfaces further include hydrodynamic lift means for receiving fluid from said first fluid region and generating a hydrodynamic fluid force during shaft rotation which biases said ring segments radially outwardly against said biasing force, said lift means comprising a plurality of tapered feed grooves which are recessed radially in said radial direction into said inner segment surface to define a radial groove depth wherein each said feed groove has closed sides defined by axially-extending side edges lying within said inner groove surface that are circumferentially spaced apart in a side-to-side circumferential direction to define a circumferential groove width, each of said feed grooves extending axially from said first end face between an open outer groove end at said first end face and a closed inner groove end spaced axially from said first end face to define an axial groove length, and which said feed grooves are configured to receive fluid axially into said open outer groove ends from said first fluid region, said radial groove depth of each of said feed grooves progressively decreasing along said axial groove length from said outer groove end to said inner groove end to generate said hydrodynamic fluid force during shaft rotation which acts radially outwardly away from said shaft and against said biasing force to reduce contact forces between said inner diameter of said seal ring and said opposing shaft surface when in contact and minimize formation of a clearance space therebetween as a result of shaft rotation, said radial groove depth also progressively decreasing in said side-to-side circumferential direction from a center groove portion toward at least one said side edge of said feed groove where said radial groove depth is shallower at said one side edge than said radial groove depth in said center groove portion, said axially-extending side edges of said feed grooves being circumferentially spaced apart and converging circumferentially sidewardly toward each other from said outer groove ends toward said inner groove ends, where said circumferential groove width is widest at said outer groove ends and said circumferential groove width is narrowest at said inner groove ends, such that said circumferential groove width for each said feed groove progressively decreases in said axial direction away from said outer groove end.

2. The segmented seal assembly according to claim 1, wherein said outer groove ends of said feed grooves open axially from said first end face of said seal ring and said radial groove depth is deepest at said first end face.

3. The segmented seal assembly according to claim 1, wherein said plurality of said feed grooves are provided in circumferentially spaced relation about said inner diameter to define lands which extend circumferentially between said side edges of adjacent said feed grooves and which are adapted for sealing contact with said outer shaft surface and separation therefrom during shaft rotation.

4. The segmented seal assembly according to claim 1, wherein said biasing arrangement comprises an annular biasing member extending circumferentially about said outer diameter to hold said ring segments together.

5. The segmented shaft seal according to claim 1, wherein said feed grooves are conical along an axial length thereof to define said radial groove depth which progressively decreases along said axial groove length and across said circumferential width.

6. The segmented seal assembly of claim 1, wherein each said feed groove has said side edges lying in said inner segment surfaces and extending axially uninterrupted within said inner segment surfaces between said outer and inner groove ends to define said closed sides of each said feed groove.

7. In a segmented seal assembly configured to be mounted on an equipment body for sealing an outer circumferential shaft surface of a rotatable shaft which is rotatable about a shaft axis extending in an axial direction, said seal assembly adapted to be positioned within an annular chamber disposed circumferentially about said shaft, said seal assembly including an annular seal ring which circumferentially extends about a center ring axis and is configured to extend circumferentially about said outer shaft surface to sealingly separate high and low pressure regions one from the other which said high and low pressure regions contain relatively high and low pressure fluid therein, said seal ring comprising a plurality of arcuate ring segments which are assembled within said seal assembly circumferentially adjacent to each other wherein each said shaft segment includes opposite first and second end faces, which face axially, and inner and outer segment surfaces which respectively face radially inwardly and outwardly toward and away from said center ring axis so as to be radially spaced apart and extend circumferentially to respectively define an inner diameter and an outer diameter of said seal ring extending about said center ring axis, said seal assembly including a biasing arrangement acting on said outer ring diameter to generate a respective biasing force on said ring segments which acts radially inwardly to maintain said ring segments in circumferentially adjacent relation with said inner diameter of said seal ring being adapted for sealing cooperation with said outer shaft surface, wherein the improvement comprises said seal ring including lift means for generating a hydrodynamic fluid force during shaft rotation which biases said ring segments radially outwardly against said biasing force, said lift means comprising a plurality of tapered feed grooves disposed on said inner surfaces of said ring segments which extend from open outer groove ends receiving said high pressure fluid to closed inner groove ends, said feed grooves being recessed radially in said inner segment surfaces so as to have a radial groove depth tapering radially inwardly along an axial groove length of said feed grooves to receive said high pressure fluid therein from said high pressure region to generate said hydrodynamic fluid force during shaft rotation which acts radially outwardly away from said shaft and against said biasing force to reduce contact forces between said inner diameter of said seal ring and said opposing shaft surface and minimize formation of a clearance space therebetween as a result of shaft rotation, said feed grooves being circumferentially spaced apart and being tapered wherein said radial groove depth of each said feed groove progressively decreases in said axial direction along said axial groove length from said outer groove end, where said radial groove depth is deepest, to said inner groove end, where said radial groove depth is shallower, and wherein said radial groove depth of each said feed groove also progressively decreases in a side-to-side direction from a center groove portion toward at least one said side edge of said feed groove where said radial groove depth is shallower at said one side edge than said radial groove depth in said center groove portion, each of said feed grooves having closed sides defined by axially extending opposite side edges lying in said respective inner segment surfaces which extend from said outer groove ends to said inner groove ends and converge circumferentially sideways toward each other to define a circumferential width of said feed grooves which progressively decreases from said outer end where said circumferential width is widest to said inner end thereof where said circumferential width is narrowest, and said inner groove ends terminating a partial distance across an axial width of said inner ring surface to define an annular sealing dam which is adapted for substantially continuous circumferential contact with said outer shaft surface.

8. The segmented seal assembly according to claim 7, wherein said outer groove ends of said feed grooves open axially toward said high pressure region to receive said high pressure fluid which circulates into said feed grooves through said open outer groove ends to define said hydrodynamic fluid force.

9. The segmented shaft seal assembly according to claim 7, wherein said feed grooves are conical along said axial groove length thereof to define said radial groove depth.

10. In a segmented shaft seal assembly having a holder and a plurality of arcuate ring segments disposed in circumferentially adjacent relation to define an annular seal ring which is supported by said holder, said seal ring having inner and outer diameters wherein said inner diameter is adapted for circumferential contact with an outer surface of a rotatable shaft, comprising the improvement wherein said ring segments are molded so as to have opposite first and second end faces which face in opposite axial directions and inner and outer segment surfaces which face radially inwardly and outwardly in opposite radial directions, said inner and outer segment surfaces respectively being aligned circumferentially with said ring segments disposed in circumferentially adjacent relation such that said inner and outer ring surfaces respectively define inner and outer circumferential ring surfaces of said seal ring having at least a constant inner diameter, said inner segment surfaces having respective tapered lift grooves which each extend axially in one said radial direction along a respective one of said inner segments from an open outer end at said first end face to a closed inner end spaced from said first end face in said axial direction, each said lift groove being recessed radially in said inner segment surface to define a radial groove depth which progressively decreases along an axial groove length extending away from said first end face to generate a hydrodynamic lift force during shaft rotation that acts radially outwardly away from said shaft to reduce contact forces between said inner ring diameter and said outer shaft surface, each said lift groove having said radial groove depth defined radially between said inner segment surface and a recessed groove surface, and having a circumferential width defined between opposite convergent side edges of said lift groove which said side edges are circumferentially spaced apart in a side-to-side direction, said side edges lying in said inner segment surface respectively so as to extend uninterrupted within said inner segment surface between said first end face and said closed inner end and define closed sides of said lift groove, each said lift groove having said open outer end which opens axially from said first end face to receive fluid therethrough and said closed inner end which terminates part way across said inner segment surface, said lift grooves tapering along said axial groove length such that the radial groove depth of said lift grooves progressively decreases along the axial groove length away from said open outer ends where said radial groove depth is deepest with said open outer ends being larger than said respective closed inner ends to permit removal of a mold die axially away from said first end face during manufacture, said radial groove depth defined between said recessed groove surface and said respective inner segment surface also progressively decreasing circumferentially from side to side so that said radial groove depth is shallower at said side edges than at a center groove portion disposed between said side edges, said side edges converging circumferentially toward each other in the side-to-side direction such that the circumferential width of said lift grooves progressively decreases in the side-to-side direction along the axial groove length extending away from said open outer ends which are wider than said closed inner ends.

11. The segmented seal assembly according to claim 10, wherein said outer segment surface has an arcuate channel having an open end and a closed end which said closed end terminates part way across an axial width of said outer segment surface, said open end having said circumferential width and said radial groove depth being greater at said open end than at said closed end to permit axial removal of a mold die during manufacture thereof.

12. The segmented seal assembly according to claim 11, wherein an annular spring is seated axially within said arcuate channel to hold said ring segments together in circumferentially adjacent relation.

13. The segmented seal assembly according to claim 10, wherein said radial groove depth tapers in the side-to-side direction so as to progressively decrease towards both of said side edges thereof.

14. The segmented seal assembly according to claim 10, wherein said holder is configured to fit within an equipment body.

15. The segmented seal assembly according to claim 10, wherein said holder is formed separate from and configured to be securely mounted on an equipment body.

* * * * *